March 31, 1970     S. R. VIGOT     3,503,276
LATERAL EXTENSION HANDLE FOR CULTIVATORS
Filed Oct. 18, 1968     2 Sheets-Sheet 1
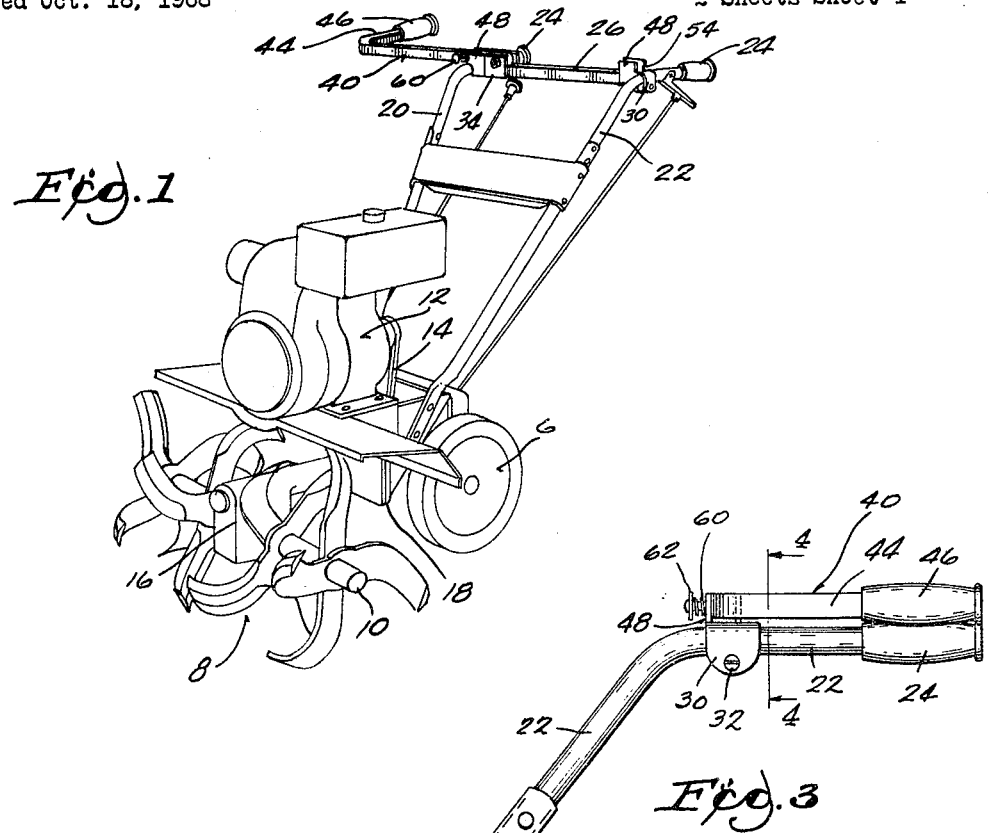
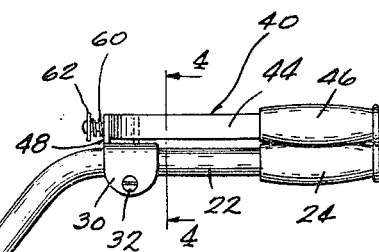
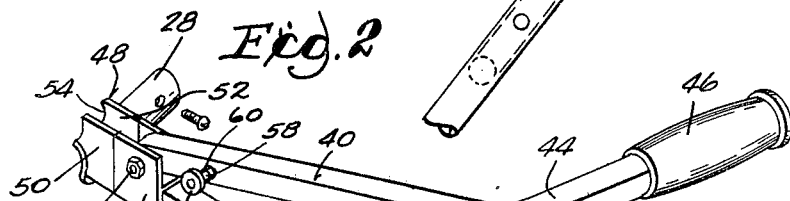
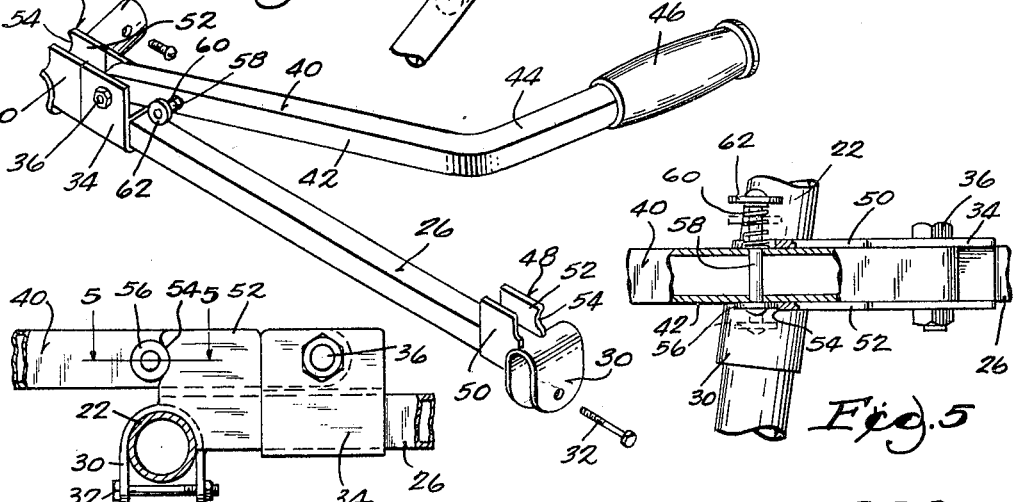
INVENTOR
SERGE R. VIGOT
BY Wheeler, Wheeler, House & Clemency
ATTORNEYS

INVENTOR
SERGE R. VIGOT

United States Patent Office 3,503,276
Patented Mar. 31, 1970

3,503,276
LATERAL EXTENSION HANDLE FOR CULTIVATORS
Serge R. Vigot, La Celle St. Cloud, France, assignor to Ariens Company, Brillion, Wis., a corporation of Wisconsin
Filed Oct. 18, 1968, Ser. No. 768,851
Int. Cl. B62d *51/04*
U.S. Cl. 74—544         6 Claims

ABSTRACT OF THE DISCLOSURE

A support bar applicable across the handle of a conventional cultivator or the like carries a slide to which an extension handle is pivoted for use either at the right or the left of the regular cultivator handle. A latch releasably holds the slide and auxiliary handle in selected position so that the operator can use the auxiliary handle to walk at one side of the path of the cultivator instead of directly behind it.

BACKGROUND OF THE INVENTION

The operator of a conventional cultivator or other soil working implement is normally obliged to guide the cultivator while working on the freshly cultivated soil, thus destroying in some measure the finely cultivated state in which the soil has been left by the implement.

SUMMARY OF INVENTION

In order that the operator who guides the cultivator can walk at one side of the path of the cultivator and still maintain proper guidance control thereof, an auxiliary handle which is preferably an accessory has been provided by the instant invention. A support bar spans the space between the two handles of the implement and its ends are connected with the respective handles. Upon this bar a slide is reciprocable between positions in proximity to the respective handles. The extension handle is pivoted to the slide and has a portion which is approximately the length of the bar to be superimposed thereon when not in use. When the cultivator is in use, the extension handle may be swung on its pivot to project from the slide laterally beyond the original handle of the vehicle so that an operator using the vehicle may walk at the side thereof on which the implement has not yet operated. The extension bar has clips which engage the auxiliary handle and which are formed to provide recesses engaged by a detent on the auxiliary handle to hold the auxiliary handle in its operatively extended position at either side of the implement.

BRIEF DESCRIPTION OF DRAWINGS

FIG. 1 is a perspective view of an implement equipped with an auxiilary handle in accordance with the invention.

FIG. 2 is a view in perspective showing the attachment per se, with the auxiliary handle in an intermediate position.

FIG. 3 is a side elevational view showing a fragment of the implement handle with the attachment in place and the auxiliary handle projecting toward the observer.

FIG. 4 is a view taken in section on the line 4—4 of FIG. 3, the mounting bar and auxiliary handle being fragmentarily illustrated.

FIG. 5 is a fragmentary detail view taken in section on the line 5—5 of FIG. 4.

DESCRIPTION OF THE PREFERRED EMBODIMENT

Figure 6:
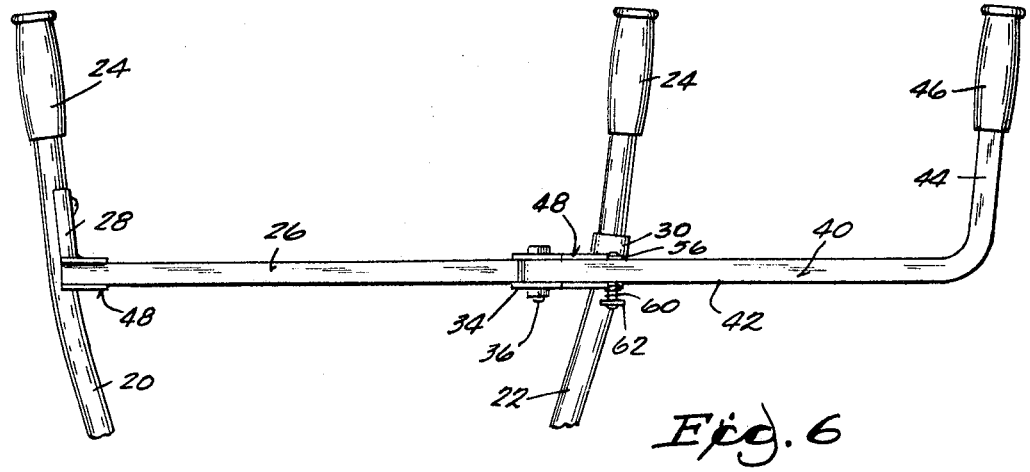
FIG. 6 is a plan view of the attachment on fragmentarily illustrated portions of the handle of an implement.

It will be understood that the auxiliary handle may be used with any kind of an implement in which it is desired that the operator guiding the implement walk at one side of the path thereof. The implement selected for exemplification of the use of the invention is a garden cultivator having supporting wheels 6 and tined rotors 8 mounted on shaft 10 and actuated from engine 12 by means of belt 14 and gear box 16.

Connected to the frame 18 of the cultivator are the right and left handles 20, 22 provided with the usual individual grips 24.

The present invention contemplates the use with this conventional structure of an attachment comprising a support bar 26 extending between the right and left handles and attached thereto. The particular attaching means is optional. By way of exemplification, I have shown the bar 6 equipped with a semi-tubular channel 28 adapted to be screwed to the right handle 20 and a clamp member 30 adapted to engage the left handle 22 and adapted to be tightened thereon by a bolt 32.

In the instant exemplification, the bar 26 is of square cross section but this is not essential. A slide 34 is reciprocable longitudinally of the bar 26 between positions in which it is selectively proximate to the respective handle 20 or 22. The slide carries a pintle bolt 36 by means of which the auxiliary handle 40 is pivoted to the slide. This auxiliary handle has a generally rectilinear portion 42 and a portion 44 which extends rearwardly therefrom and carries the auxiliary grip 46.

Adjacent each end of the support bar 26 there is an upwardly opening clip 48. The rectilinear portion 42 of the bar 40 is selectively receivable in either of the respective clips 48.

Figure 7:
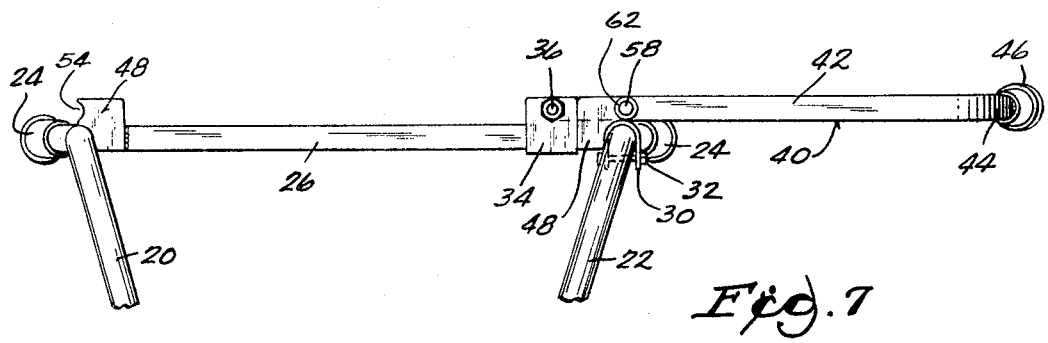
FIG. 7 is the front elevation of the parts shown in FIG. 6.

Each of these clips 48 comprises a pair of upstanding flanges 50, 52. The outwardly exposed edges of these flanges are provided with notches 54 in which detent means carried by the auxiliary handle is releasably engageable. In the preferred construction shown, the detent means comprises a disk 56 at the end of a bolt 58 reciprocable transversely through the portion 42 of handle 40 and subject to the bias of a spring 60 which tends to draw the disk into face contact with the side of the portion 42 of the auxiliary handle. In this position, the disk 56 is engaged in the notch 54 of clip 52, thereby holding the auxiliary handle in its selected position of lateral projection. As shown in FIG. 1, the auxiliary handle is projecting at the right of the cultivator handle 20, thereby enabling the operator to use the grips on handle 20 and on auxiliary handle 40 to guide the cultivator while walking at the right of the path of the cultivator. In the position shown in FIGS. 3, 6 and 7, the auxiliary handle is projecting to the left so that the operator will use the grip 46 on the auxiliary handle and the grip 24 on the regular handle 22 to guide the cultivator while walking at the left of its path.

Figure 8:
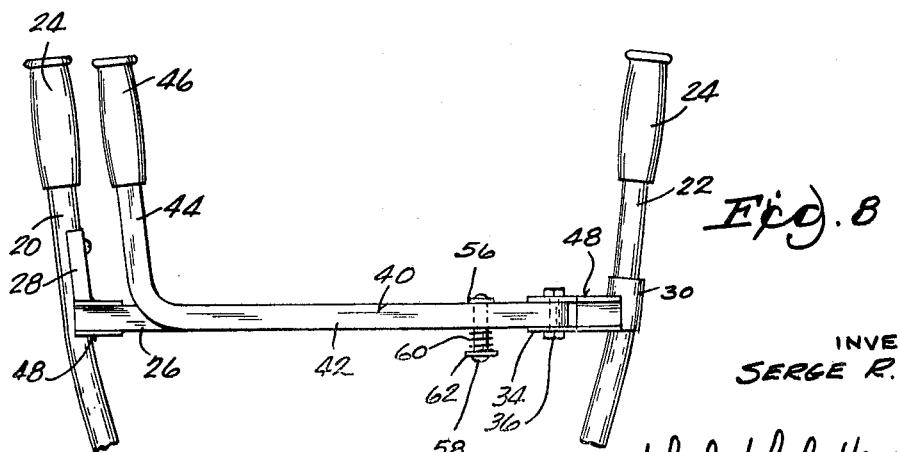
FIG. 8 is a plan view showing the auxiliary handle pivoted to a storage position without changing the position of the slide to which it is pivoted.

When the cultivator is turned to reverse its direction at the end of a row, the detent is released by pressure on the spring seat end 62 of the bolt 58, thereby moving the bolt toward the observer as viewed in FIG. 5 and disengaging the detent disk 56 from the notch 54 of the clip 52. This release, effected against the bias of spring 60, permits the auxiliary handle to be swung upwardly to clear the clip, whereupon it may be manipulated either to a storage position shown in FIG. 8, or to that which it is approaching in FIG. 2, or the slide may be reciprocated to the opposite end of the support bar 26 so that the handle 42 may be engaged with the clip which is attached to the other handle of the cultivator. As the auxiliary handle is moved to operative position in the clip with which it then engages, the detent may be manipulated to engage the notch of the last mentioned clip to hold the handle in its new position.

It is contemplated that newly built cultivators or the like may be provided with auxiliary handles as herein disclosed. However, the exemplification above described is applicable readily to existing cultivator handles, enabling the operator to guide the cultivator while walking either at the right or the left of the cultivated area, in order to avoid walking on any soil previously cultivated.

I claim:

1. An agricultural implement having guidance handles which are laterally spaced and characterized by an auxiliary handle selectively movable to project at one side of the implement handle to a position offset from the path of the implement.

2. An attachment for an agricultural implement having right and left handles, said attachment comprising an auxiliary handle and means pivotally mounting the auxiliary handle for movement to and from an operative position in which it projects laterally from one of the implement handles.

3. An attachment according to claim 2 in which the auxiliary handle is pivotally connected with a slide and the slide is mounted on a support bar which extends transversely between the implement handles and has means for connecting its ends therewith.

4. An attachment according to claim 3 in which the support bar has position fixing means adjacent its respective ends and with which the auxiliary handle is selectively engageable according to its position of pivotal movement with respect to the slide, and according to the position of the slide.

5. An attachment according to claim 4 in which a detent means releasably connects the auxiliary handle with the position fixing means for holding the auxiliary handle in a selected position with respect to the support bar.

6. An attachment according to claim 5 in which the position fixing means comprises a clip having upstanding flanges between which a portion of the auxiliary handle is disposed in its operative position, one of the said flanges being notched and the auxiliary handle having a member engageable with said notch and constituting said detent means, and means biasing said member to a position for such engagement, said member having a manually operable support for releasing it from such engagement.

References Cited

UNITED STATES PATENTS

| | | | |
|---|---|---|---|
| 1,660,131 | 2/1928 | Lenfers | 74—551.8 XR |
| 2,401,796 | 6/1946 | Raitch | 74—551.3 XR |

FRED C. MATTERN, JR., Primary Examiner

F. D. SHOEMAKER, Assistant Examiner

U.S. Cl. X.R.

74—551.8; 280—47.37